(12) United States Patent
Al-Jlil

(10) Patent No.: US 8,197,693 B2
(45) Date of Patent: Jun. 12, 2012

(54) APPARATUS AND PROCESS FOR PRODUCING ELECTRICITY USING PRESSURE RETARDED OSMOSIS DURING DESALINATION OF SEA WATER

(75) Inventor: Saad A Al-Jlil, Riyadh (SA)

(73) Assignee: King Abdulazia City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/350,778

(22) Filed: Jan. 15, 2012

(65) Prior Publication Data
US 2012/0111794 A1 May 10, 2012

Related U.S. Application Data

(63) Continuation of application No. 13/175,860, filed on Jul. 3, 2011, and a continuation of application No. 13/338,071, filed on Dec. 27, 2011.

(51) Int. Cl.
*B01D 61/36* (2006.01)
*B01D 3/00* (2006.01)
*B01D 9/00* (2006.01)
*B01D 37/00* (2006.01)

(52) U.S. Cl. ........ 210/652; 210/642; 210/650; 210/651; 210/653; 210/654; 210/758; 210/767; 210/804; 210/805; 210/806; 210/808; 210/175; 210/179; 210/194; 210/195.1; 210/195.2; 210/195.3; 210/321.6; 210/321.66; 210/258; 202/200; 203/10

(58) Field of Classification Search .................. 210/642, 210/650, 651, 652, 653, 654, 723, 758, 767, 210/804, 805, 806, 808, 175, 179, 194, 195.1, 210/195.2, 195.3, 321.6, 321.66, 25, 257.1, 210/258; 203/10; 202/200
See application file for complete search history.

(56) References Cited

U.S. PATENT DOCUMENTS

| | | | | |
|---|---|---|---|---|
| 4,834,793 A * | 5/1989 | Schneider et al. | ............... | 75/743 |
| 5,501,798 A * | 3/1996 | Al-Samadi et al. | ........... | 210/652 |
| 7,371,520 B2 * | 5/2008 | Zhao et al. | ................... | 435/6.19 |
| 7,392,848 B1 * | 7/2008 | Bader | ........................... | 166/371 |
| 7,744,761 B2 * | 6/2010 | Constantz et al. | ............ | 210/652 |
| 7,789,159 B1 * | 9/2010 | Bader | ........................... | 166/371 |
| 2009/0152199 A1 * | 6/2009 | Ma et al. | ....................... | 210/640 |

OTHER PUBLICATIONS

Sidney Loeb, Comparative Mechanical Efficiency of Several Plant Configurations Using a Pressure-Retarded Osmosis Energy Converter, Journal of Membrane Science, 51 (1990) 323-335.

Sidney Loeb et al., Effect of porous support fabric on osmosis through a Loeb-Sourirajan type asymmetric membrane, Journal of Membrane Science 129 (1997) 243-249.

(Continued)

*Primary Examiner* — John Kim
(74) *Attorney, Agent, or Firm* — Geeta Kadambi; Riddhi IP LLC

(57) ABSTRACT

Sea water is not suitable for human consumption. Naturally present dissolved chemicals in sea water make it inconsumable. The precipitants and dissolved chemicals need to be separated from water to make it consumable. A combination of aeration system, filtration system, crystallizer, hydrophobic membrane carrying filter and pressure retarded osmosis system are used in various combination to desalinate the sea water. Pressure retarded osmosis process is also used to produce pressurized diluted brine which is further decompressed to by the turbine and used by the generators to produce electricity. Various heat exchange apparatus are used for energy conservation and efficient processing of water in a feasible way. The disclosure enables to purify water and provide an economical means for producing electricity.

3 Claims, 5 Drawing Sheets

OTHER PUBLICATIONS

Sidney Loeb, Energy production at the Dead Sea by pressure-retarded osmosis: challenge or chimera?, Desalination 120 (1998) 247-262.

Masahiro Murakami, Hydro-powered reverse osmosis (RO) desalination for co-generation: A Middle East case study, Desalination, 97 (1994) 301-311.

Mehta et al. Internal Polarization in the Porous Substructure of a Semipermeable Membrane Under Pressur.e-Retarded Osmosis, Journal of Membrane Science, 4 (1978) 261-265.

Sidney Loeb, Large-scale power production by pressure-retarded osmosis, using river water and sea water passing through spiral modules, Desalination 143 (2002) 115-I22.

K.L.Lee et al., Membranes for Power Generation by Pressure-Retarded Osmosis, Journal of Membrane Science, 8 (1981) 141-171.

Andrea Achilli et al. Power generation with pressure retarded osmosis: An experimental and theoretical investigation, Journal of Membrane Science 343 (2009) 42-52.

Sidney Loeb et al., Production of Energy From Concentrated Brines by Pressure-Retarded Osmosis, Journal of Membrane Science, 1(1976) 249-269.

Sidney Loeb, Production of Energy From Concentrated Brines by Pressure-Retarded Osmosis I. Preliminary Technical and Economic Correlations, Journal of Membrane Science, 1(1976) 49-63.

* cited by examiner

APPARATUS AND PROCESS FOR PRODUCING ELECTRICITY USING PRESSURE RETARDED OSMOSIS DURING DESALINATION OF SEA WATER

CROSS REFERENCE TO RELATED APPLICATION

This application is a continuation in part of the application Ser. Nos. 13/175860 filed on Jul. 3, 2011 and 13/338071 filed on Dec. 27, 2011. The pending U.S. application Ser. Nos. 13/175860 and 13/338071 are hereby incorporated by reference in their entireties for all of their teachings.

FIELD OF TECHNOLOGY

This disclosure relates generally to an apparatus, a system and method for producing electricity using pressure retarded osmosis (PRO) during desalination of sea water. More particularly, to a method of using pressure retarded osmosis along with other apparatuses such as turbines to produce electricity during desalination of sea water.

BACKGROUND

Water is a precious resource and one of the natural elements that needs to be conserved. Many regions in the world have scare electricity production and water resources and the heavy industrial use further depletes these resources in developed and developing countries. In countries like Saudi Arabia it is critical to manage these resources and maximize the use.

Recent rural and urban development along with increase in population requires more good quality water not only for drinking but also for other uses. Electricity shortages have impeded development and effected normal life. The water shortage is becoming a global issue especially in the arid and semi-arid regions of the world. According to United Nations (1999), water shortage, besides the global warming, has been considered as the most worrying problem for the new millennium. Keeping in view this scenario, the importance of sea water desalination technology has gained momentum for the production of safe drinking water. Moreover, the conventional water desalination technologies such as reverse osmosis (RO) and others suffer from many disadvantages. These technologies are expensive to be adopted in poor countries. The RO is a pressure driven process which is highly susceptible to fouling. In addition to that, the cost effectiveness of the RO plants is strongly dependent on the energy resources such as oil and gas prices.

According to Mehta et al. (1978) pressure retarded osmosis (PRO) creates a hydraulic pressure gradient to produce pressurized brine and power may be obtained by depressurization using a hydro-turbine. Lee et al. (1981) discuss varies options to use PRO for power generation and conclude that using brine and fresh water sources and current membranes are more favorable to generate power (electricity). Loeb S (2002) describes the use of spiral membranes to produce by the application of PRO for river/sea water pair. There is a need for alternative approaches over the conventional desalination technologies and generation of power.

SUMMARY

The disclosure describes an apparatus, a system and a process of desalinating sea water to restore and/or maintain the basic life-sustaining natural elements, i.e., water. More particularly an apparatus, system and process for desalinating sea water using different configuration of the apparatus comprising of pressure retarded osmosis is described.

In one embodiment, sea water is heated using solar energy using solar panel, solar water heater or any other means of using solar energy or any other form of energy. More specifically solar energy is used by harnessing the heat via solar panels. In one embodiment, desalination of sea water using novel aeration system is described. In another embodiment, a filtration system is described. The filtration system may be used in combination with the aeration system. In another novel embodiment, an apparatus to perform pressure retarded osmosis is used along with aeration system and the filtration system to desalinate sea water. In one embodiment, the instant method of desalination the sea water has no brine remaining after it has gone through the apparatus, system and processes.

In one embodiment, the diluted brine is used to recycle the heat contained in the sea water. The diluted brine from the pressure retarded system (PRO system) is fed back along with feed stream for further purification.

In one embodiment, multiple units in parallel comprising of hydrophobic membranes are used as membrane distillation system. The membrane distillation system may be used with a vacuum pump. The vacuum may be used on one side of the unit containing the membrane to have effective separation of the water vapor. The water vapor is collected in one embodiment as distillate water for human consumption. The water vapor may also be sent to the heat exchanger to provide heat to the feed stream coming from filtration system.

The brine water collected from the membrane units in parallel, in another embodiment, is sent to the pressure retarded osmosis system to further get distilled. The diluted brine water may be sent back to the membrane distillation system for further purification after dilution of the brine water which has passed through the heat exchanger.

In one embodiment, the splitter collects the condensed water vapor formed as distillate water from the heat exchange and splits it into two streams. One feed goes to the PRO system and the other feed is directed as distillate water to a collection tank for consumption.

In one embodiment, suction fan is used to collect water vapor from aeration system and filtration system and passed on to the heat exchanger to use the latent heat.

In one embodiment, sea water is passed through the multi unit in parallel membrane distillation system. Sea water feed that is hot comes in contact with the hydrophobic membrane. Vacuum is applied on the permeate side of the membrane and the water vapor is collected. The water vapor is condensed and collected as a distillate water.

In one embodiment, the distillate water is tested for acceptable level of heavy metal contaminant and may be sent back to the membrane distillation system for a second iteration for removal of dissolved contaminants if the levels are below local authority authorized level.

In another embodiment, the PRO passed diluted brine water is fed to a turbine which in turn is connected to a generator to produce electricity for contributing to the net power. In another embodiment, the brine water and distillate water is paired to produce a pressure gradient in the PRO unit and passed through the turbine to generate electricity.

The methods, systems and processes disclosed herein may be implemented in any means for achieving various aspects, and may be executed manually or automated using a computer. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

In the instant disclosure several apparatuses, processes and systems for desalinating water and producing electricity are disclosed. Although the present embodiments have been described with reference to specific example embodiments, it will be evident that various modifications and changes may be made to these embodiments without departing from the broader spirit and scope of the various embodiments.

The instant application discloses the apparatus, process and system that materially enhance the quality of the environment of mankind by contributing to the restoration or maintenance of the basic life-sustaining natural elements, i.e., water and producing power (electricity). The instant disclosure illustrates with example after removal of heavy metal and salt from water and sea water may be used as drinking water, hence helping in restoration and reuse of natural resource such as water.

The instant application also discloses an apparatus, method and system for producing electricity when the process of desalination of sea water is being performed.

Figure 1:
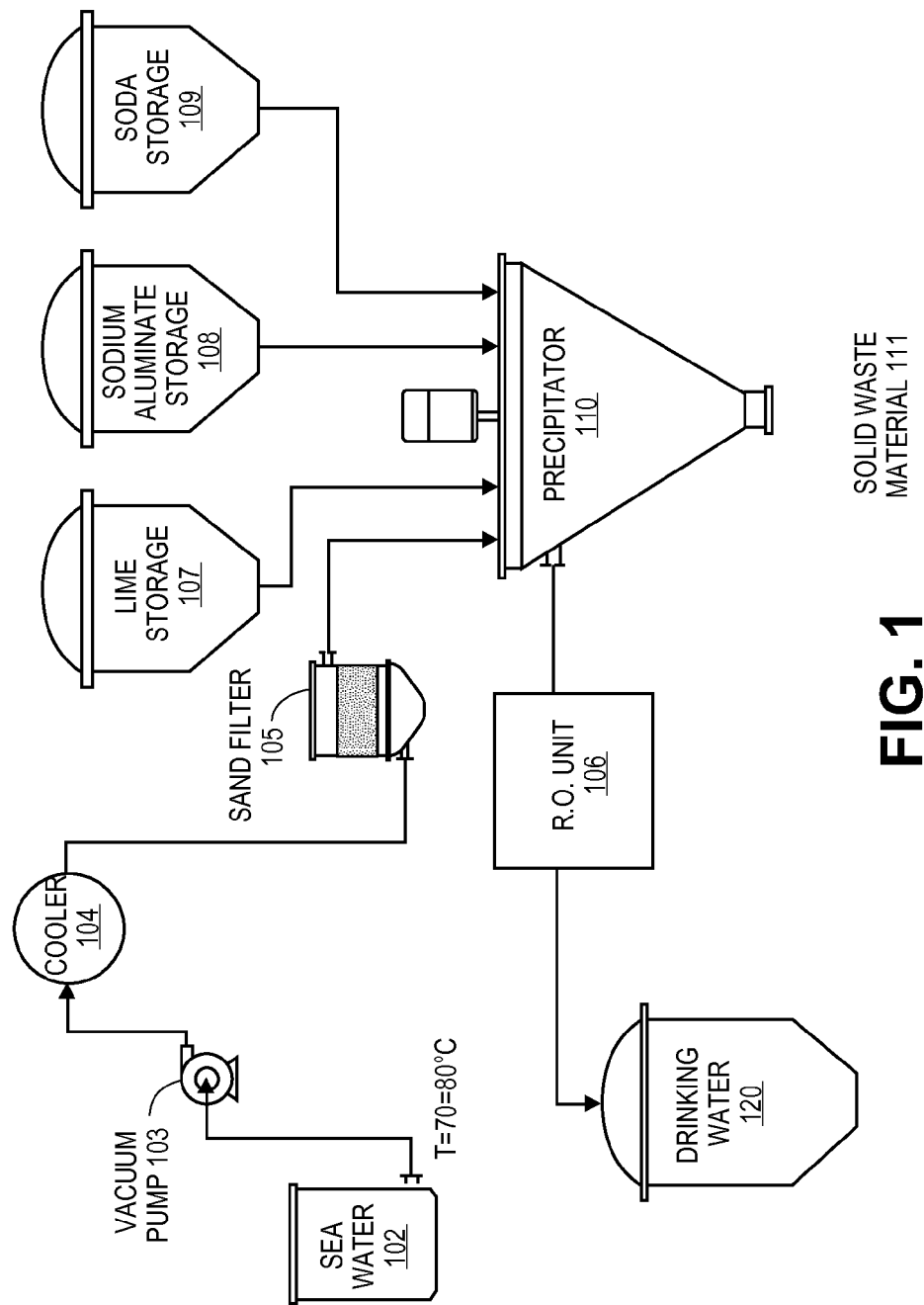
FIG. 1 is a flow diagram of the prior art of performing reverse osmosis.

The following disclosure illustrates several embodiments in detail. A relatively inexpensive, low energy consumption, but highly effective desalination procedure for removal of dissolved salts from sea water is described. FIG. 1 shows a production of drinkable water using an expensive reverse osmosis process. Reverse osmosis (RO) is a filtration method that removes many types of large molecules and ions from solutions by applying pressure to the solution when it is on one side of a selective membrane. The resultant solute is retained on the pressurized side of the membrane and the pure solvent is allowed to pass to the other side. To be "selective", this membrane should not allow large molecules or ions through the pores (holes), but should allow smaller components of the solution (such as the solvent) to pass freely. Reverse osmosis is most commonly known for its use for the production of drinking water from seawater desalination by removing the salts and other substances from the water molecules. The reverse osmosis process is effective but very time consuming, expensive and laborious. The operating pressure for reverse osmosis is between 40-60 bar and the pore size of either cellulose acetate or polysulfone coated with aromatic polyamides are <0.002 µm.

The instant description enables the user to use various combinations of aeration system, filtration system, suction pump, membrane based distillation system, heat exchangers, splitter, and pressure retarded osmosis apparatus to desalinate sea water to provide drinking water and/or usable water for human consumption. Various examples and their benefits in producing desalinated water through low cost high efficiency using various combinations of configuration of systems are described as examples below. The instant description specifically concentrates on the aeration system, filtration system; pressure retarded osmosis system/apparatus, membrane distillation system, turbine and generator to produce desalinated drinkable water and electricity.

Figure 2:
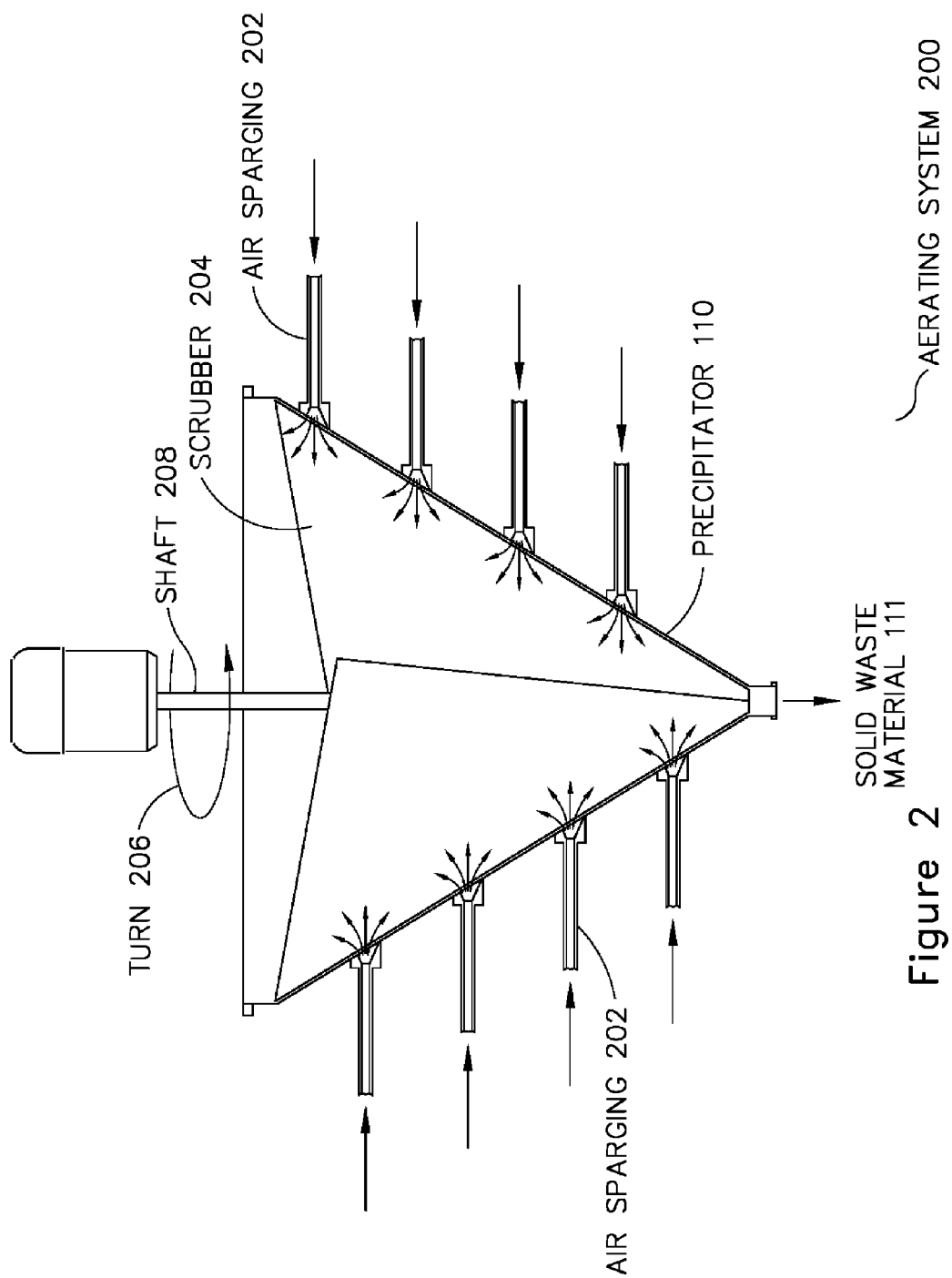
FIG. 2 shows an aeration system 200.

FIG. 2 shows an aeration system 200. Aeration system includes conical vessel precipitator 110 with smooth internal surface and scrubber 204. This aeration system will be used as a pretreatment before membrane distillation (MD) system stage to reduce and minimize the fouling in the MD system. Generally, the sea waters contain various types dissolved chemicals such as salts and salt ions such as iron (Fe), manganese (Mn), calcium (Ca) and magnesium (Mg) salts including other solids as waste. The sea water may be heated to 60° C. using solar panels. The hot sea water is pumped into an aeration unit which results in the precipitation of salts. Also, the salts causing hardness will be deposited in aeration tank due to the high temperature of the sea water. Well water usually contain 0.5 to 30 parts per thousand salt, while the average saltiness of seawater is 35 parts per thousand.

One of the primary dissolved chemical as waste in sea water may be in the form of salt. For example, sea water has trace amounts of calcium bicarbonate and calcium sulfates as dissolved chemicals. Calcium bicarbonate changes to calcium carbonate at temperature above 50° C. which precipitates while carbon dioxide is liberated and the calcium carbonate forms a waste 250.

These dissolved chemicals in sea water a waste can be precipitated and be used as adsorbent. This solid waste can be removed by operating the scrubber in certain time intervals and use the removable solid as a new adsorbent to adsorb heavy metals from sea water.

Figure 3:
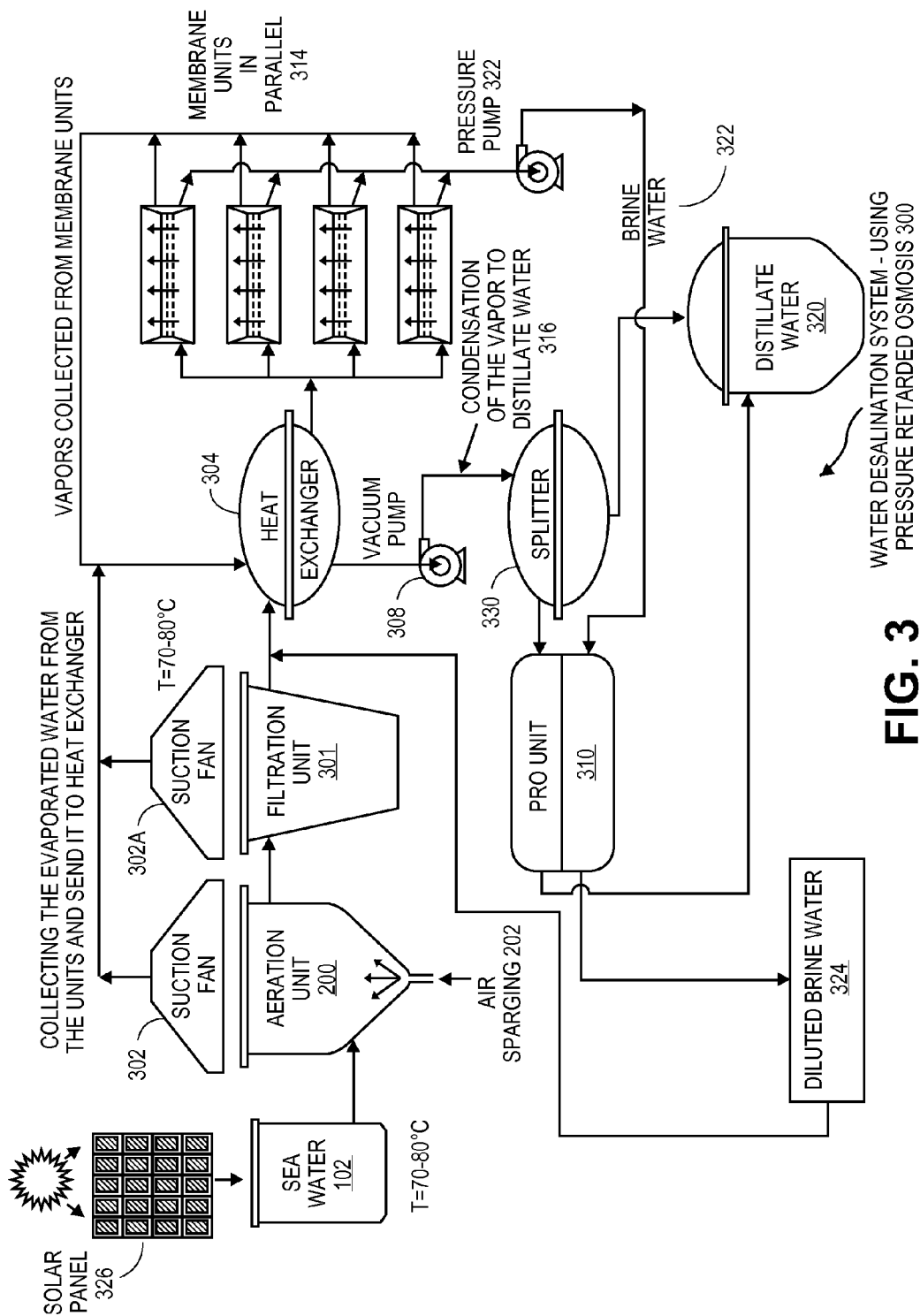
FIG. 3 shows a schematic view of the method, system and apparatus to perform the Pressure Retarded Osmosis (PRO system) for treating sea water to produce distillate water.

FIG. 3 shows water desalination system which comprises of Pressure retarded osmosis system 300. This system is a combination of various systems to produce desalinated distillate water 320 for human consumption. Sea water 102 is pumped into an aeration system to remove contaminants (precipitating and dissolving) and precipitants. Since the sea water is heated using solar energy in the form of solar panels 326 or other means such as water heaters using solar energy. Some water vapor is collected using suction fan 302 to send it to heat exchanger 304. Salts that cause hardness to the sea water are precipitated by using air sparging in the aeration system.

Distillate water from MD is pumped into a PRO apparatus 310 containing membranes, semi-permeable. The distillate water flows on one side of the membrane and diffuses through the membrane into the pressurized side of the membrane filled with brine sea water. The distillate water from the PRO system is collected in distillate water 320 for consumption. The brine generated by the PRO system is either recirculated to the feed stream for further purification. This system enables to produce near zero level brine free distillate water for consumption.

Subsequently, sea water is passed to filtration unit 301 to remove any suspended materials. In aeration stage and filtration stage, any water that evaporated will be collected by using suction fan (302-302A etc) and the vapor is further transported to the heat recovery system (heat exchanger 304). The water is passed through the aeration system (e.g. sea water) and filtration system (e.g. secondary sea water) to reduce membrane fouling as sea. Otherwise the organic substances etc promote microorganism and bacterial growth and cause biofouling of the membrane. The heat exchanger transfers the heat to the feed stream for the membrane distillation system comprising of several membrane units in parallel (314) and the water vapor may be condensed to distillate water 320 and collected in distillate water tank to be distributed for human consumption.

Through the heat exchanger 304 the water is sent to membrane distillation system. The membrane distillation (MD) system is made up of several membrane units that are used in parallel 314. Each MD system contains a hydrophobic membrane (poly-vinylidene fluoride (PVDF)) to separate water and dissolved minerals. The membrane distillation process includes micro-porous hydrophobic hollow fiber membrane modules. PVDF membrane is chosen in this study for membrane preparation because it is a commercially available hydrophobic polymer. To enhance the hydrophobicity of the fabricated PVDF membrane, a Polyvinylpyrrolidone can be added. The membrane distillation process includes micro-porous hydrophobic hollow fiber membrane modules. Therefore, the operating pressure will be equal to the natural atmospheric pressure (equal to 1-bar).

The operating temperatures in this new innovative process can be maintained as low as 50° C. and the operating pressure for MD will be equal to the natural atmospheric pressure (equal to 1-bar). This will make this process high energy efficient and cost effective, especially when combined with low grade energy sources. Therefore, the main objective of this work is to develop a low cost process as an alternative process to RO for drinking water production from sea water desalination plant with zero brine discharge and production of electricity (power).

The sea water feed to the MD system is hot (60° C.) and is brought into contact on one side of the hydrophobic membrane. The vacuum is applied through a vacuum pump 308 through the membrane permeate side. Hydrophobic nature of the functional membrane prevents the liquid water streams stay outside the membrane while water vapors will penetrate from the feed side. The pressure gradient such as a higher partial pressure than the permeate side with a lower partial pressure also enhances the separation. This enables distillate water will be collected in the permeate side in a continuous manner. Another pressure pump 321 is used between the MD system and splitter 330. After the water has passed the MD system and has not passed through the membrane as a vapor would become a retentate stream which contains concentrated solutes in it. In order to further desalinate it is passed through the PRO system and collected as diluted brine water 324. The diluted brine water 324 is circulated back to the system for getting processed via the MD units in parallel 314. The water vapor is passed to the heat recovery system to transfer the heat to the feed of MD unit and the water vapor will be condensed to water form and collect in distillate water tank.

The operating temperatures in this new innovative process can be maintained as low as 50° C. and the operating pressure will be equal to the natural atmospheric pressure (equal to 1-bar). This will make this process high energy efficient and cost effective, especially when combined with low grade energy sources.

The very low operating pressure allows thinner piping and fewer maintenance problems. Also, the capital and maintenance expenses for MD will be lower in comparison to pressure-driven membrane separation processes like RO. The integrated MD systems will be a potential alternative to RO water desalination because the thermal energy is naturally available from the deep seas.

In this example, the sea water (60° C.) after heating using solar energy is pumped from the container to the aeration unit including air sparging to precipitate most of the salts causing hardness and, to precipitate iron oxides and manganese oxides by using heat treatment and aeration process. Then, water is passed to filtration unit to remove any suspended materials. In aeration stage and filtration stage, any water evaporated will be collected by using suction fan and send this vapor to the heat recovery system (heat exchanger) to transfer the heat to the feed of MD unit and the water vapor will be condensed to water form.

Therefore, membrane distillation (MD) in which pure water (distillate water) is produced as permeate from the MD process and the distillate water is then split into two streams; one will go to collection tank for distilled water and the second stream will go to PRO system 310.

After filtration stage, water is passed to membrane distillation (MD). In membrane distillation (MD), vacuum is applied in the permeate side of the membrane module by means of a vacuum pump. In this case, condensation occurs outside of the membrane module by using energy recovery system (heat exchanger). On the membrane permeate side, vacuum may be applied in the membrane permeate side. Because of the hydrophobic nature of the functional membrane, liquid water streams will be kept outside the membrane while water vapors will penetrate from the feed side with a higher partial pressure to the permeate side with a lower partial pressure. In this way, fresh water will be collected in the permeate side in a continuous manner.

A concentrated MD retentate stream (brine water) will be returned to the PRO unit and the diluted brine water from the PRO unit will be circulated as the MD feed stream (zero brine discharge).

Part of the distillate water from MD is pumped into a PRO system containing membranes, semi-permeable. The distillate water flows on one side of the membrane and diffuses through the membrane into the pressurized side of the membrane filled with brine sea water. The diluted and pressurized seawater is depressurized in a turbine to generate power and the diluted brine water from the PRO system will be recirculated as the MD feed stream.

Figure 4:
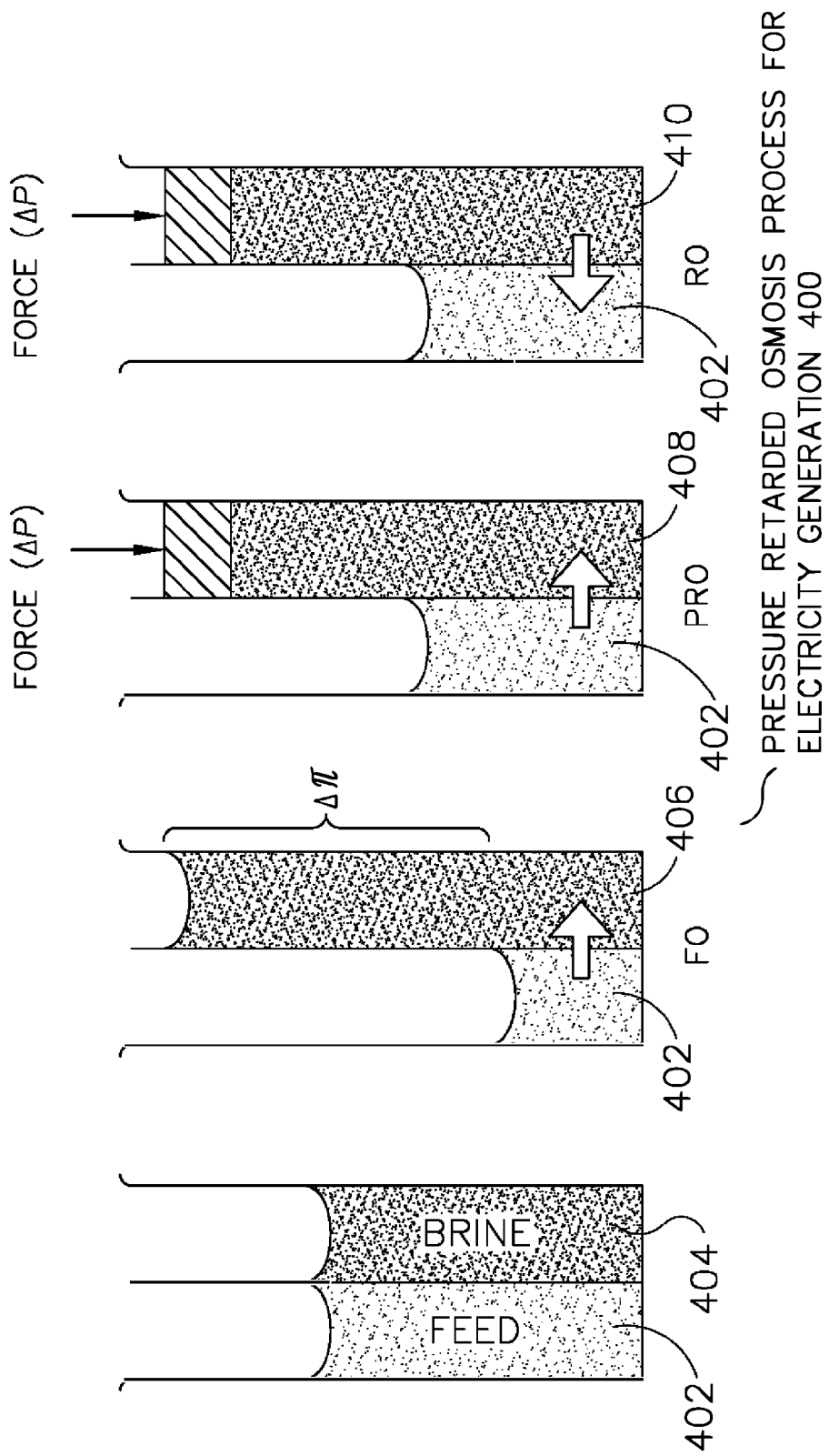
FIG. 4 shows the force generation due to PRO process for electricity generation 400.

As shown in FIG. 4, Pressure-retarded osmosis (PRO) system is used as a potential process for power generation. The different feed and brine columns are shown for several different processes such as PRO and RO processes. PRO process uses the osmotic pressure difference between diluted brine and distillate water, to pressurize the saline stream, thereby converting the osmotic pressure of seawater into a hydrostatic pressure that can be used to produce electricity. Osmosis is the transport of water across a selectively permeable membrane from a region of higher water chemical potential to a region of lower water chemical potential. It is driven by a difference in solute concentrations across the membrane that allows passage of water, but rejects most solute molecules or ions. Osmotic pressure ($\pi$) is the pressure which, if applied to the more concentrated solution, would prevent transport of water across the membrane. Forward osmosis (FO) uses the osmotic pressure differential ($\pi$) across the membrane, rather than hydraulic pressure differential (as in reverse osmosis, RO), as the driving force for transport of water through the membrane. The FO process results in concentration of a feed stream and dilution of a highly concentrated stream (referred to as the draw solution). PRO can be viewed as an intermediate process between FO and RO, where hydraulic pressure is applied in the opposite direction of the osmotic pressure gradient (similar to RO). However, the net water flux is still in the direction of the concentrated draw solution (similar to FO). For FO, P is zero; for RO, P>π; and for PRO, π>P. Wherein P is the applied pressure as shown FIG. 4. For PRO, water diffuses to the more saline liquid that is under positive pressure (π>P).

Renewable energy can be extracted wherever two streams of different salinity or different chemical potential meet. Considering that the salinity of seawater yields significant osmotic pressures and that of the osmotic pressure of distillate water (in this disclosure) is relatively significant, a large portion of the pressure can be used for power generation.

Figure 5:
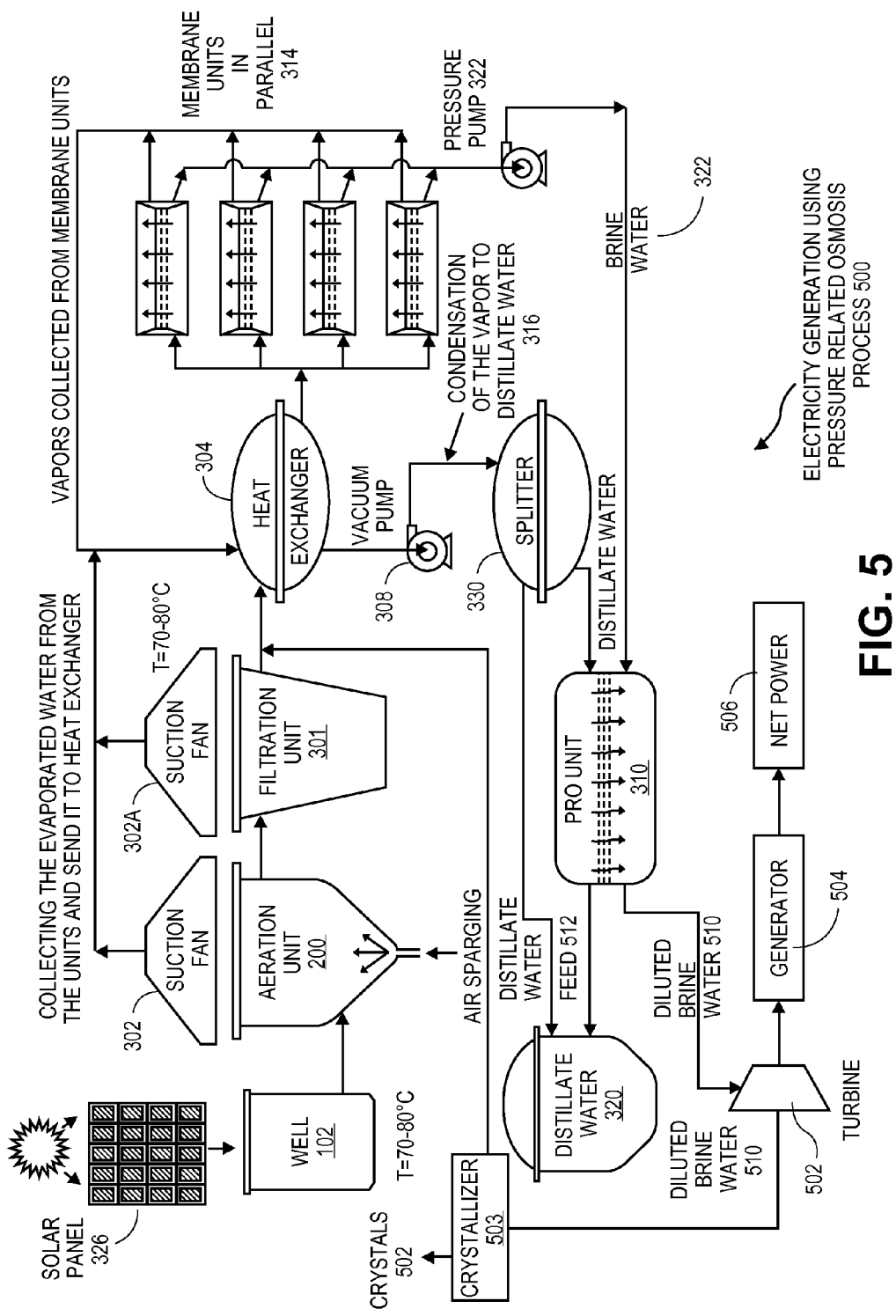
FIG. 5 shows electricity generation using PRO process 500 during desalination of sea water.

In FIG. 5, a PRO process is used similar to FIG. 4. However, a power generation system is described along with the additional apparatus such as a turbine 502, generator 504 and net power 506 to send power to the grid. The principles and method shown for PRO process in FIG. 4 as one method that can be used to realize this energy. In PRO, the brine contained in the sea water is distilled and the pairing of distillate water and diluted sea water is used for pressure creation. The pressurized sea water is depressurized in a turbine to generate power. The diluted brine water is sent to the crystallizer unit 503. The crystallizer water is sent back to the MD as a stream for recirculation and desalination.

In addition, the specification and drawings are to be regarded in an illustrative rather than as in a restrictive sense.

What is claimed is:

1. A process for producing electricity, comprising;
    heating a sea water using solar energy to 60° C. to produce a heated sea water;
    pumping the heated sea water to an aeration system as a feed stream to remove a precipitate as a soluble contaminant as a pretreatment of the sea water to form a secondary sea water for further processing;
    filtering the secondary sea water to remove a contaminant and to reduce a fouling, using at least one of a regular filter and a ceramic filter;
    distilling the filtered secondary sea water using a membrane distillation system to produce a distillate water;
    performing pressure retarded osmosis to further desalinate the distillate water to produce a zero brine water;
    collecting the distillate water and the zero brine water that is desalinated in a distillate tank for human consumption;
    generating an electricity using a pressurized diluted brine produced by the pressure retarded osmosis system and
    removing the contaminant using a crystallizer and recirculating the diluted brine to the membrane distillation system and reducing the volume of diluted brine to be disposed for the environment.

2. The process of producing electricity as in claim 1, further comprising;
    heating the feed stream using solar energy prior to aeration to precipitate the soluble contaminants.

3. The process of claim 1, wherein the filtering is performed using a hydrophobic membrane.

* * * * *